United States Patent [19]

Joubert

[11] 4,074,786
[45] Feb. 21, 1978

[54] SELF LOCKING COMPARTMENT FOR TRACTOR

[75] Inventor: Jerauld D. Joubert, Argusville, N. Dak.

[73] Assignee: Steiger Tractor Inc., Fargo, N. Dak.

[21] Appl. No.: 713,105

[22] Filed: Aug. 10, 1976

[51] Int. Cl.² ..................... B60R 18/02; B60R 3/00
[52] U.S. Cl. .......................... 180/68.5; 280/164 R; 296/37.1
[58] Field of Search ............... 180/68.5, 65; 296/37.1, 296/37.6, 37.8, 37.2, 37.14, 37.15, 146; 280/164 R

[56] References Cited

U.S. PATENT DOCUMENTS

| | | | |
|---|---|---|---|
| 1,488,720 | 4/1924 | Tichy et al. | 280/164 R |
| 1,726,398 | 8/1929 | Limbocker | 296/37.1 |
| 2,647,011 | 7/1953 | Walker | 296/37.2 |
| 2,797,957 | 7/1957 | North | 296/37.14 |
| 2,981,554 | 4/1961 | Mulder et al. | 280/164 R |
| 3,058,771 | 10/1962 | Hill et al. | 296/37.15 |
| 3,231,292 | 1/1966 | Lorenz | 296/37.1 X |
| 3,270,829 | 9/1966 | Steiger et al. | 180/51 |
| 3,347,334 | 10/1967 | Schroeder | 180/68.5 |
| 3,471,070 | 10/1969 | Olson | 280/505 X |
| 3,477,538 | 11/1969 | Hall et al. | 180/65 R |
| 3,863,729 | 2/1975 | Von Fummetti et al. | 280/164 R X |
| 3,865,210 | 2/1975 | Von Fummetti et al. | 280/164 R X |
| 3,933,216 | 1/1976 | Irwin | 180/54 R |
| 4,013,136 | 3/1977 | Fear | 296/37.1 X |

*Primary Examiner*—Philip Goodman
*Assistant Examiner*—Milton L. Smith
*Attorney, Agent, or Firm*—Frederick E. Lange

[57] ABSTRACT

A tractor having a driver's cab, an accessory compartment in the fender immediately adjacent the door to the driver's cab, the accessory compartment having a cover forming part of the fender and which projects below the edge of the cab door so that when the cab door is closed, it is impossible to raise the cover of the accessory compartment. In this way, when the door is locked, the accessory compartment is also automatically locked. The accessory compartment may hold a battery or tools or both. In the particular form shown, there is a battery compartment and tool compartments adjacent to the battery compartment. The invention is particularly applicable to the type of tractor which is sufficiently large that steps are required to reach the door of the driver's cab. In such case, the cover for the compartment may also include a downwardly extending part of the fender and one of the steps may be secured to this downwardly extending part. The inclusion of a downwardly extending part as part of the accessory cover makes it possible when the cover is raised to provide greater access to the battery and also makes it possible to provide an additional tool compartment beneath the battery.

11 Claims, 6 Drawing Figures

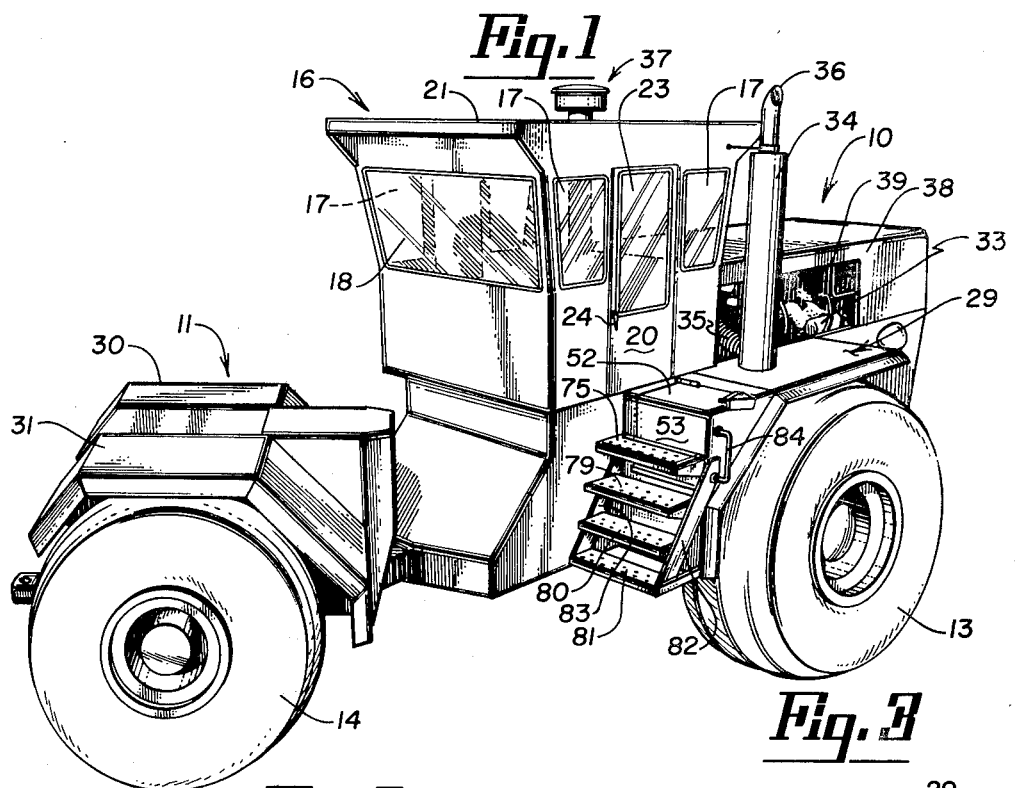
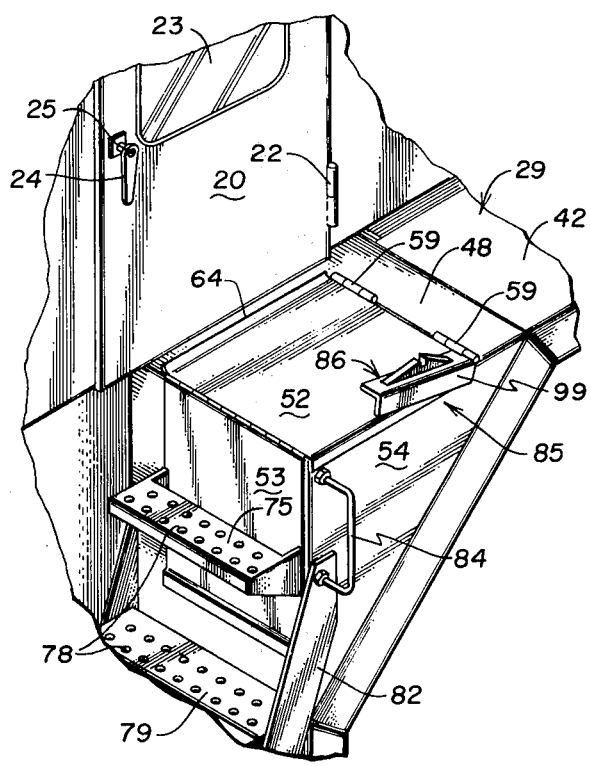
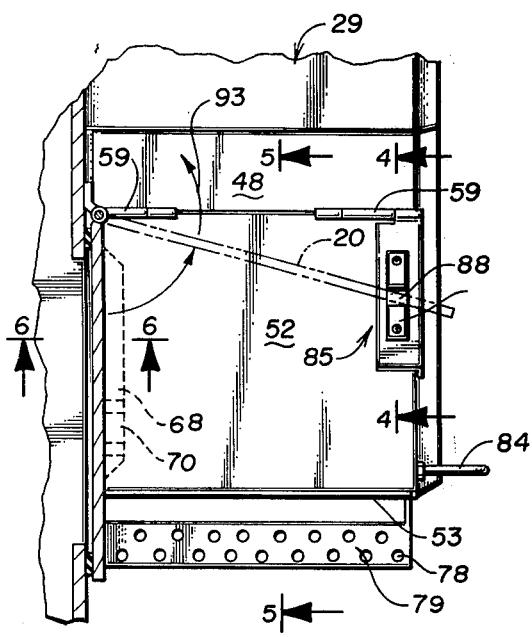
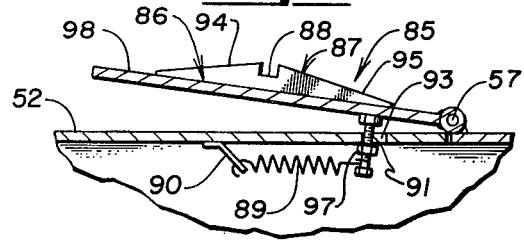

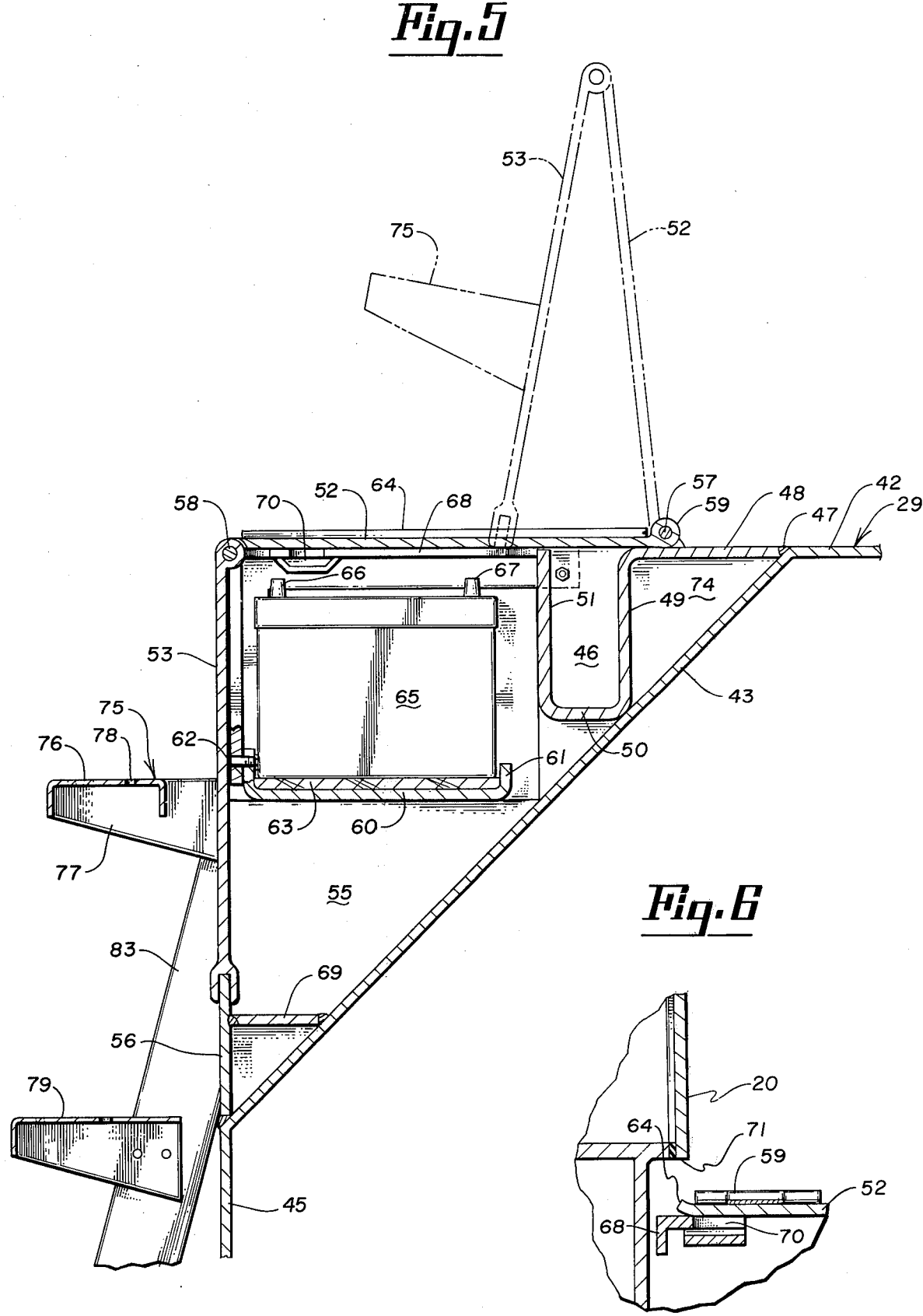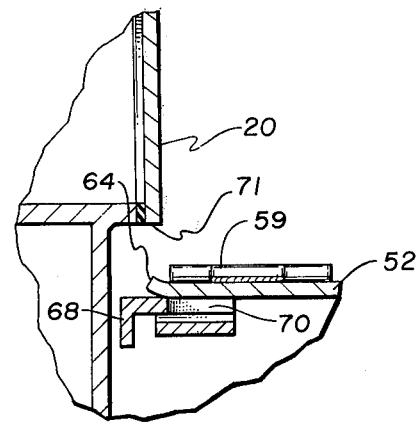

SELF LOCKING COMPARTMENT FOR TRACTOR

BACKGROUND OF THE INVENTION

It is very important in connection with tractors which are used on very large fields, often rather remote from the place of storage, to have some place on the tractor for conveniently storing accessories such as tools. Also, such tractors often must be left on the field over night and since they often employ rather expensive batteries it is desirable to maintain the battery compartment locked when the tractor is left unattended. To an increasing extent, as field tractors have become larger and carry more equipment such as radios and relatively large batteries, there has been a tendency for such auxiliary equipment to be stolen if the tractor is left unlocked in the field. As a result, it has become customary with large tractors, particularly with those having driver's cabs, to provide means for locking the cab by locking the access doors thereto. This protects the equipment within the cab such as the radio but it does not necessarily insure that the accessories are properly locked up. While it is possible to provide for the accessories being in compartments with separate locks, this requires additional work upon the part of the operator before leaving the tractor and often such additional compartments are thus left unlocked.

While the battery can be placed in the engine compartment, it is customary with large tractors to have the hood cut away adjacent the engine so as to provide better access to certain components of the engine. Thus even if the battery is in the engine compartment, it still can be readily stolen therefrom. Furthermore, the engine compartment is relatively hot and the life of a battery is longer when it is in a cooler location.

SUMMARY OF THE PRESENT INVENTION

The present invention is concerned with a tractor in which the driver's cab has an access door to the cab and in which there is a compartment beneath the fender adjacent this door which has a cover which extends beneath the door to the driver's cab when the door is closed so that it is impossible to raise up the cover to the compartment when the door to the cab is in closed position. Thus, if the door is locked, the compartment door is also locked.

The cover for the compartment may include a downwardly extending movable portion of the fender so that when the cover compartment is raised, both the top and the sides of the accessory compartment will be exposed.

The invention further contemplates that where the accessory compartment includes a downwardly extending portion of the fender, this fender may have a step secured thereto which assists in access to the driver's cab when the compartment cover is in closed position.

Specifically, the accessory compartment may be a battery compartment of a shape to receive a battery of the type employed with a tractor for supplying electrical energy thereto. The battery is thus located in a relatively cool location. The compartment may include a tool compartment. In the particular form of the invention shown, there are two tool compartments located adjacent the battery chamber.

Further features and objects of the invention will be apparent from a consideration of the accompanying specification, claims and drawing.

BRIEF DESCRIPTION OF THE DRAWING

FIG. 1 is a perspective view of a tractor of the type to which my invention is applied, showing the accessory compartment door in closed position;

FIG. 2 is a perspective view of a portion of the tractor showing the compartment door in more detail and on a larger scale than in FIG. 1;

FIG. 3 is a top plan view of a portion of the structure of FIG. 2 showing the top of the accessory compartment cover;

FIG. 4 is a sectional view showing a door catch, the section being taken along the line 4—4 of FIG. 3, FIG. 5 is a sectional view taken along the line 5—5 of FIG. 3 and also showing the cover in dotted lines in open position;

FIG. 6 is a sectional view showing the lower edge of the door and the top of the accessory compartment, the section being taken along the line 6—6 of FIG. 3.

DESCRIPTION OF THE PREFERRED EMBODIMENT

Referring first to FIG. 1 which, as previously indicated is a perspective view of a tractor of the type to which my invention is applied, the vehicle is shown as having a front section 10 and a rear section 11. These two sections are preferably connected together through a pivotal connection which permits relative turning movement of the two sections about a vertical axis. Turning is effected by the use of two hydraulic cylinders on each side of the longitudinal axis, one of which is extended and the other contracted when turning is desired. Vehicles of this general type are shown in the Steiger et al U.S. Pat. No. 3,270,829 and the Irwin U.S. Pat. No. 3,933,216.

The front section 10 is supported by two wheels, only wheel 13 of which is shown. These wheels are mounted upon an axle, not specifically shown, which is rigidly secured to the frame of the vehicle. The back section is similarly supported by two wheels, only wheel 14 of which is shown. The rear wheels are similarly mounted upon an axle (not shown) rigidly secured to the frame of the back section. The front section 10 has a body portion comprising a frame on which is supported an enclosed operator's cab 16 having a plurality of side windows 17 and a rear window 18. The cab is further provided with a door 20 and a roof 21. The cab 16, in the form shown, tapers outwardly towards the top so that the overall area of the roof 21 is substantially greater than the cross sectional area of the base of the cab. The door 20, as best shown in FIG. 2, is secured to the cab proper by a plurality of hinges 22, only one of which is shown. The door has a window 23 therein and has a handle 24 for opening and closing the door, the handle being provided with a conventional lock 25.

The front section 10 is provided with a pair of fenders, only one fender 29 of which is visible in the drawing. Similarly, the rear section is provided with a pair of fenders 30 and 31. The fenders 29, 30 and 31 each extend at least partially over the wheels with which they are associated.

It is to be understood that the cab 16 is supported upon the frame of the tractor in a conventional manner. Also supported on the frame is an internal combustion engine 33 which may be of any suitable type such as a Diesel engine. Extending vertically up from the front fender 29 is an exhaust stack 34 connected through a conduit 35 to the exhaust manifold of engine 33. At the upper end of the exhaust stack 34 there is a suitable gas discharge deflector 36. Located on the opposite side of the cab and only partially visible in the drawing is an air intake stack 37. It will be understood that this air intake stack 37 is connected through an air intake pipe and an air cleaner to the intake manifold. The air may pass through a compressor driven by an exhaust gas driven turbo supercharger before entering the intake manifold.

It will be noted that the engine 33 is located within a hood 38 having an opening 39 in the side thereof for enabling access to the engine. It is to be understood that a similar opening is located on the opposite side of the hood.

Referring now to the invention of the present application, it will be noted that the front fender 29 has a horizontally extending portion 42, as best shown in section in FIG. 5, which is bent downwardly at an angle to provide a sloping portion 43 which in turn is bent to provide a vertically extending portion 45. The horizontal portion 42, the sloping portion 43 and the vertically extending portion 45 define a wheel cavity in which the wheel 13 is disposed. Secured as by a welding 47 to the horizontal extending portion 42 is a further horizontal sheet 48 of metal which may be the same type of sheet metal as the material of which the previously described portion of fender 29 is formed. The metal 48 is bent downwardly to form a vertical section 49 and is bent again horizontally to form a horizontal section 50 and again upwardly to form another vertical section 51. It will be noted that the sections 49, 50 and 51 partially define a compartment 46. This compartment 46 is closed at its opposite sides by an outer panel or wall 54 (FIG. 2) and a triangular inner panel or sidewall 74 (FIG. 5). It will thus be seen that the sidewalls 49 and 51, the bottom wall 50, and the opposite end walls 54 and 74 define the walls of the compartment 46. This compartment is designed for the reception of tools used in maintenance and repair of the tractor.

A horizontally extending plate 52 of sheet metal is pivotally secured to the horizontal plate 48 by a pair of pivotal connections 59. A pivot pin 57, as best shown in FIG. 4, extends through each pivotal connection. Pivotally secured to the horizontal plate 52 is a vertical plate 53 of sheet metal which terminates at its lower end in a bifurcated portion designed to straddle the upper end of a short vertical plate 56 secured as by welding to the lower portion of the fender. The vertical plate 53 is preferably pivotally secured to the horizontal plate 52 by a pivotal connection 58 (FIG. 5). This enables the horizontal plate 52 to be swung about the pivot 59 without swinging out the portion 53. In other words, the portion 53 can be moved substantially vertically to raise the plate 52 and swing it to the position shown in dotted lines in FIG. 4.

It will be readily observed that the sloping portion 43 of fender 29, along with the horizontal plate 52 and the vertical plates 53 and 56 form a triangular compartment which is used in the present invention as a compartment for various accessories. This is closed at its outer side by plate 54 and at its inner side by a second triangular plate 55. A further shelf 69 of metal is welded at its opposite ends to the end plates 54 and 55 and sloping wall 43, and forms a bottom wall of this further compartment which may be employed for the storage of tools or any other accessories used in maintenance of the tractor. When the horizontal plate 52 and the vertical plate 53 are in their closed position as shown in FIG. 5, any tools and other accessories placed in this compartment are thoroughly secured and are protected against removal from the compartment.

Secured to the end plates 54 and 55 is a shelf 60 which has upturned ends 61 and 62. Fitted on this shelf 60 is a plywood board 63 which serves as the base for the reception of a battery 65 having suitable terminals 66 and 67. Any suitable means (not shown) of a conventional type may be employed for holding down the battery 65 and retaining it in engagement with the plywood board 63. Because the vertical plate 53 is movable along with the horizontal plate 52, it will be readily apparent that when these plates are moved to the position shown in dotted lines in FIG. 5, the battery 65 can readily be removed since it is exposed both at the top and at one end. In addition, any tools or accessories located beneath the battery are readily accessible. By tilting the plates 52 and 53 further back than they are in the position shown in FIG. 5, access can readily be had to the tool compartment 46.

In order to support the vertical plate 53 when it is in the dotted line position shown in FIG. 5, there is provided a bracket 68 which is of angular cross-section as shown in FIG. 6 and which is secured by bolts or other suitable fastening means to the fender construction. For example, I have shown it as being bolted to the angular plate 74 and also to the upturned flange 62 of the battery shelf 60. This bracket 68 has a horizontal flange on which the lower bifurcated end of the plate 53 rests when in its raised position shown in dotted lines in FIG. 5. At the same time, I provide a safety catch 70 which consists of a notch through the edge of the horizontal flange of bracket 68 and a strap member secured to the under side of the bracket 68 to support the lower end of the vertical plate 53. The purpose of notch 70 is to ensure against accidental closure of the battery cover. If the plates 52 and 53 start moving to closed position, the bifurcated lower end of plate 53 will enter the notch 70 and be stopped from further movement. It is obvious that if the plates 52 and 53 were in the position shown in dotted lines in FIG. 5 and if someone were working on the battery or removing tools or accessories from one of the compartments described above, severe injury could happen to the person if the cover moved towards closed position. The downward movement of the vertical plate 53 would, under these conditions, result in a substantial shearing force. By providing a notch 70, it is assured that the vertical plate 53 will not accidentally move towards closed position but will stop when the lower end enters the notch 70.

As has been previously pointed out, the present apparatus is designed to provide a tool compartment which is automatically locked when the door 20 is locked. As best shown in the fragmentary view of FIG. 6, the lower edge 71 of the door 20 extends over an inner curved edge 64 of the flat plate 52. Thus, when the door 20 is in its closed position, as shown in FIGS. 1 and 2, it is impossible to raise the cover plate 52 sufficiently to enable any access to the compartment beneath the cover plate 52. Accordingly, when the door 20 is closed and locked, the compartment formed between cover plate 52 and vertical plate 53 is locked and it is impossible to gain access to the tools in compartment 46, the battery 65 or any of the tools or accessories in the compartment beneath the battery 65. Furthermore, this is accomplished without the use of an additional lock of any type so that the locking of the door automatically insures that the accessory compartments described above are also locked.

It will be noted that there is secured to the vertical cover plate 53 a step 75 having a treadplate 76 of inverted U-shape cross-section which is secured to triangular end plates 77 secured to the vertical plate 53. The step 75 is one of a series of steps provided to enable ready access to the cab door. The steps are best shown in FIG. 1. The remaining steps 79, 80 and 81 are supported by a pair of inclined beams 82 and 83 which are welded to the side plates 54 and 55. As will be apparent from FIG. 1, these steps 79, 80 and 81 project progressively further to the rear as is common in connection with steps. The treadplates of these steps are provided with suitable apertures 78 to minimize the collection of dirt on the steps and to reduce the likelihood of a foot slipping on the steps. While the upper surface of the horizontal cover plate 52 has been shown as smooth, it is to be understood that this surface may likewise be provided with any suitable means to prevent slippage of the foot on the cover plate 52 since in normal use, this acts as the top treadplate upon which the operator steps when leaving or entering the cab. A hand rail 84 is bolted to the side plate 54 and to the beam 82 to aid one in stepping on to the lower step 8.

As is readily apparent from FIG. 5, when the cover plate 52 and the vertical cover plate 53 are moved to the position in which access can be had to the accessory compartments, the step 75 is likewise moved. This has the advantage of moving the step 75 out of the way so that it does not interfere with access to the accessory compartment. At the same time, the lower steps 79, 80 and 81 remain in position to enable the operator to stand on a selected one of these steps to facilitate examination of the contents of the accessory compartments.

A door latch is generally designated by the reference numeral 85. That latch is the subject matter of my co-pending application Ser. No. 712,856, entitled "Tractor Door Latch" and filed Aug. 9, 1976. As best shown in FIGS. 2 and 4, this door latch comprises a plate 86 of angular cross-section to which is secured a triangular vertical plate 87, having a notch 88 adjacent the upper apex of the triangle. The angular plate 86 is pivotally mounted on pivot pin 57 of pivot 59. Notch 88 is of a width slightly greater than the thickness of the door 20 so that the lower edge 71 of the door 20 can readily enter this notch 88, as shown in dotted lines in FIG. 3. The angular plate 86 is biased upwardly by a spring 89 which has one end attached to an ear 90 secured to the under side of the cover plate 52. The other end of the spring 89 is secured to the lower end of a stud 91 in the form of a bolt which extends through an aperture 93 in the plate 52 and has its head secured to the under side of the angle plate 86. It will be readily apparent that the spring 89 biases the plate 88 upwardly, the upper movement being limited by the engagement of an adjustable nut 97 with the under side of plate 52. The spring 89 thus acts to bias the latch 85 to the position shown in FIGS. 2 and 4.

It has previously been noted that the vertical plate 87 is triangular. It has two inclined upper edges 94 and 95. Inclined edge 94 slopes upwardly from the rear end of the latching member to the rear edge of the notch 88. The inclined surface 95 slopes downwardly from the forward edge of notch 88 to the forward end of plate 87. The plate 86 has a forwardly extending portion 98 which is adapted to be engaged by the foot of the operator. It was previously noted that plate 86 is of angular cross-section. It has a downwardly extending flange 99 (shown in FIG. 2) which extends downwardly parallel to plate 54 and serves to guide the movement of the plate 86. The movement of plate 86, however, is primarily determined by its pivotal connection to the pivot pin of hinge 59.

The adjusting nut 97 is normally adjusted so that the rear end of plate 86 slides beneath the path of the lower edge of door 20 when the door is moved to open position. The lower edge of the door, when moved towards open position, will engage the inclined surface 94, depressing the plate 86 against the action of biasing spring 89. When the door moves to the position shown in dotted lines in FIG. 3, the lower edge of the door will enter the notch 88 and be retained by the latch. Because the lower edge of the door is disposed within the notch 88, it will be obvious that the door is firmly retained in position. When it is desired to release the door, all that it is necessary to do is to step on the outer edge 98 of the angular plate 86, pushing the plate 86 downwardly against the bias of spring 89, thus feeding the door. It is even possible for the operator to do this when still sitting in the tractor seat.

It will be noted that when the door is in the dotted line position of FIG. 3, it still overlies the horizontal cover plate 52 so that it is still impossible to obtain access to the accessory compartment. This is the position that the door assumes when the operator is merely desirous of going in or out of the cab 16. When, however, it is desired to obtain access to the accessory compartment 52, the door latch 85 may be depressed so that the door 20 can be swung to a further open position as indicated by the arrow 93. When this happens, the door is entirely clear of the cover plate 52 and the horizontal cover plate 52 and the vertical cover plate 53 can be readily raised about the pivots 59 to a fully open position.

When it is desired to move the door back towards closed position, it will be readily apparent that the door will ride along the inclined surface 95 of the plate 87, depressing the plate 86 against the biasing force of spring 89 until the door enters the notch 88 and is again in the dotted line position of FIG. 3. If, however, it is desired to close the tractor door completely, the plate 86 may be depressed sufficiently to allow the door to fully close.

CONCLUSION

It will be seen that I have provided an arrangement for a tractor in which an accessory compartment is provided in space which otherwise would not be utilized and in which the accessory compartment is maintained locked whenever the door to the driver's cab is locked. It will also be seen that I have provided an arrangement involving a plurality of steps in which the uppermost step adjacent the accessory compartment is moved out of the way when the cover to the accessory compartment is open.

While I have shown a specific embodiment of my invention, it is to be understood that this is for purposes of illustration only and that the scope of the invention is limited to that of the appended claims.

I claim:
1. A tractor having a tractor frame,
    a driver's cab and an engine supported on said frame,
    said driver's cab having an access door movable between open and closed positions,
    a plurality of wheels supporting said frame, at least some of which are connected to said engine in driven relation thereto, one of said wheels being located beneath and adjacent said access door, a plurality of fenders each extending at least partially over one of said wheels including said one wheel beneath said access door and having an upper portion spaced from the wheel over which it extends, an accessory compartment secured beneath said upper portion of said fender in the space over said wheel, and said upper portion of said fender including a cover part overlying said compartment and hinged to a fixed part of said fender for upward swinging movement to enable access to said compartment, said cover part extending beneath the lower edge of said cab access door when said door is closed so that said cover part can not be swung upwardly to open position while said door is closed.

2. The tractor of claim 1 in which said access door has a lock so that said cover part can not be opened without unlocking said door.

3. The tractor of claim 1 in which said cover part has a downwardly extending movable portion of said fender secured to said cover part at an area spaced from the area at which said cover part is hinged to said fender so that when said cover part is raised, said downwardly extending portion is also raised to provide further access to said compartment.

4. The tractor of claim 3 in which said downwardly extending movable portion of said fender has a step secured thereto which assists in access to said driver's cab when said cover part and downwardly extending portion are in their lower closed position.

5. The tractor of claim 3 in which said fender is provided with a bracket for supporting the lower edge of said downwardly extending portion when said cover part and said downwardly extending portion are in raised position.

6. The tractor of claim 5 in which said bracket is provided with a recessed portion to prevent accidental movement of said cover part and said downwardly extending portion downwardly from raised position to closed position.

7. The tractor of claim 1 in which a yieldably biased door retainer is also pivotally secured to said fixed part of the fender and is designed for latching engagement with said door when said door is open to hold said door in open position.

8. The tractor of claim 1 in which said accessory compartment is a battery compartment of a shape and size to receive a battery of the type employed with the tractor for supplying electrical energy thereto.

9. The tractor of claim 1 in which said accessory compartment includes a tool chamber of a size and shape to receive tools of the type normally employed for field adjustments and repair of the tractor.

10. The tractor of claim 1 in which said accessory compartment has a chamber for the reception of a battery and chambers adjacent said battery chamber for the reception of tools.

11. A tractor having a tractor frame, a driver's compartment and an engine supported on said frame, a plurality of wheels supporting said frame, at least some of which are connected to said engine in driven relation thereto, said wheels supporting said frame in such a vertical position with respect to the ground that a plurality of steps are required in order for an operator conveniently to ascend into said driver's compartment, at least one of said wheels being located beneath and adjacent said driver's compartment, a plurality of fenders each extending at least partially over one of said wheels including said one wheel beneath said driver's compartment and having substantially horizontal and vertical portions pivotally secured together and to a fixed portion of said fender, said horizontal and vertical portions forming a corner of said fender and being spaced from the adjacent wheel over which the fender extends, an accessory compartment secured in the space bounded by said horizontal and vertical portions in the space over and beside said wheel, said horizontal and vertical movable portions of said fender being movable upwardly to expose said compartment and enable access thereto, and said fender having a plurality of steps thereon to enable access to said driver's compartment, one of said steps being carried by and movable with said vertical portion of said fender.

* * * * *